United States Patent
Morimoto et al.

(10) Patent No.: US 9,026,351 B2
(45) Date of Patent: May 5, 2015

(54) NAVIGATION DEVICES, METHODS AND PROGRAMS

(75) Inventors: Kyomi Morimoto, Nishio (JP); Seiji Hayashi, Anjo (JP); Yutaka Saitou, Nagoya (JP); Frederic Burguet, Louvain-la-Neuve (BE); Stephane Petti, Brussels (BE)

(73) Assignee: Aisin AW Co., Ltd., Anjo (JP)

( * ) Notice: Subject to any disclaimer, the term of this patent is extended or adjusted under 35 U.S.C. 154(b) by 870 days.

(21) Appl. No.: 12/318,218

(22) Filed: Dec. 23, 2008

(65) Prior Publication Data

US 2009/0171566 A1 Jul. 2, 2009

(30) Foreign Application Priority Data

Dec. 28, 2007 (JP) ................................. 2007-340794

(51) Int. Cl.
*G01C 21/34* (2006.01)
*G01C 21/36* (2006.01)

(52) U.S. Cl.
CPC ........ *G01C 21/3453* (2013.01); *G01C 21/3679* (2013.01); *G01C 21/3685* (2013.01)

(58) Field of Classification Search
CPC .......... G08G 1/0967; G08G 1/096716; G08G 1/09675; G08G 1/096775; G08G 1/0175; G08G 1/127; G08G 1/147; G08G 1/14; G08G 1/141; G08G 1/207; G08G 1/0965; G08G 1/096725; G08G 1/096741; G08G 1/144; G08G 1/166; G08G 1/143; G08G 1/146; G08G 1/142; G01C 21/005; G01C 21/30; G01C 21/343
USPC ......................................................... 701/201
See application file for complete search history.

(56) References Cited

U.S. PATENT DOCUMENTS

| | | | | |
|---|---|---|---|---|
| 5,486,822 | A | * | 1/1996 | Tenmoku et al. ........ 340/995.22 |
| 6,411,895 | B1 | * | 6/2002 | Lau et al. ..................... 701/425 |
| 8,063,797 | B1 | * | 11/2011 | Sonnabend et al. ....... 340/932.2 |
| 2009/0243888 | A1 | * | 10/2009 | Kawabata et al. ......... 340/932.2 |

FOREIGN PATENT DOCUMENTS

| | | |
|---|---|---|
| EP | 1 777 499 A2 | 4/2007 |
| JP | A-10-332405 | 12/1998 |
| JP | A-2000-213946 | 8/2000 |
| JP | A-2001-202544 | 7/2001 |
| JP | A 2001-349740 | 12/2001 |
| JP | A-2002-071369 | 3/2002 |

(Continued)

OTHER PUBLICATIONS

Apr. 28, 2011 European Search Report issued in EP 08 02 2464.

(Continued)

*Primary Examiner* — Maroun Kanaan
(74) *Attorney, Agent, or Firm* — Oliff PLC

(57) ABSTRACT

Navigation devices, methods, and programs set a destination, find an on-street parking zone that is in the vicinity of the destination, and find a route, by modifying a search cost for a road, that will arrive at the destination by way of a road having the on-street parking zone. The devices, methods, and programs acquire parking information that pertains to the on-street parking zone and find the route by modifying the search cost based on the parking information. The devices, methods, and programs find the route when the vehicle has reached a specified distance from the destination.

17 Claims, 14 Drawing Sheets

(56) References Cited

FOREIGN PATENT DOCUMENTS

| | | |
|---|---|---|
| JP | A-2002-373398 | 12/2002 |
| JP | A-2005-257622 | 9/2005 |
| JP | A-2006-242787 | 9/2006 |

OTHER PUBLICATIONS

Japanese Patent Office, Notification of Reason(s) for Refusal mailed Sep. 27, 2011 in Japanese Patent Application No. 2007-340794 w/Partial English-language Translation.

* cited by examiner

F I G . 3

FACILITY DATA PERTAINING TO ON-STREET PARKING ZONES

| IDENTIFICATION ID | A | B | C | D | ... | X |
|---|---|---|---|---|---|---|
| LINK ID | 000001 | 002468 | 000123 | 004444 | ... | 004989 |
| HOURS AVAILABLE | 0:00–24:00 | 0:00–24:00 | 0:00–24:00 | 8:00–18:00 | ... | 0:00–24:00 |
| USE FEE | NO CHARGE | 700 YEN / 60 MINUTES | 100 YEN / 60 MINUTES | 200 YEN / 60 MINUTES | ... | NO CHARGE |
| LOCATION COORDINATES | (x1, y1)–(x2, y2) | (x3, y3)–(x4, y4) | (x5, y5)–(x6, y6) | (x7, y7)–(x8, y8) | ... | (x21, y21)–(x22, y22) |
| VACANT SPACE PROBABILITY | 0.42 | 0.45 | 0.55 | 0.35 | ... | 0.95 |
| USER RESTRICTIONS | NO | NO | NO | NO | ... | YES (RESIDENTS ONLY) |
| ... | ... | ... | ... | ... | ... | ... |

FIG. 4

USE FEE COST FACTORS

| FEE | COST FACTOR |
|---|---|
| NO CHARGE | 0.5 |
| 1 – 10 YEN / MINUTE | 0.6 |
| 11 – 20 YEN / MINUTE | 0.7 |
| 21 – 30 YEN / MINUTE | 0.8 |
| 31 – 50 YEN / MINUTE | 0.9 |
| 51 YEN OR HIGHER / MINUTE | 1.0 |

FIG. 5

DISTANCE COST FACTORS

| DISTANCE TO DESTINATION | COST FACTOR |
|---|---|
| 0 – 50M | 0.6 |
| 51M – 100M | 0.7 |
| 101M – 500M | 0.8 |
| 501M – 1000M | 0.9 |
| 1001M OR LONGER | 1.0 |

F I G . 6
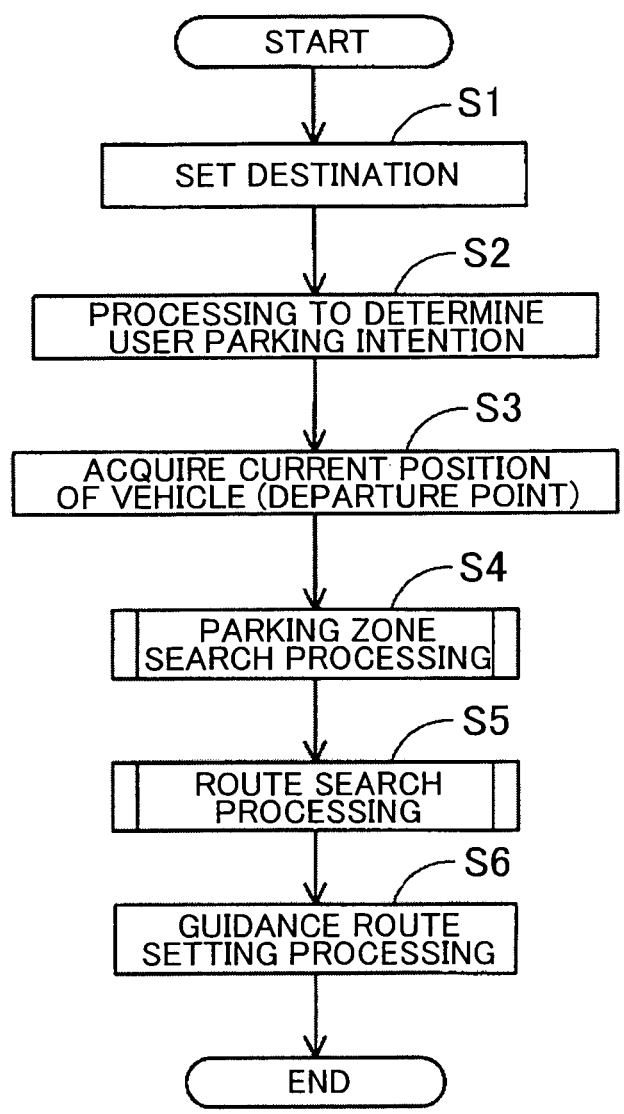

FIG. 9

ON-STREET PARKING ZONES LIST

| | A | B | C | D | ... | X |
|---|---|---|---|---|---|---|
| DISTANCE TO DESTINATION | 700m | 200m | 20m | 100m | ... | 1200m |
| PARKING COST FACTOR | 0.261 | 0.308(⇒1) | 0.162 | 0.273 | ... | 1 |
| GUIDANCE-ELIGIBLE PARKING ZONE FLAG | 1 | 0 | 1 | 1 | ... | 0 |

FIG. 13

EN ROUTE LIST

| SEQUENCE NUMBER | 1 | 2 | 3 | 4 |
|---|---|---|---|---|
| DISTANCE TO DESTINATION | 800m | 600m | 300m | 50m |
| LINK ID | 003458 | 003462 | 003463 | 003496 |
| LOCATION COORDINATES | (x11, y11)-(x12, y12) | (x21, y21)-(x22, y22) | (x31, y31)-(x32, y32) | (x41, y41)-(x42, y42) |
| HOURS AVAILABLE | 7:00-23:00 | 0:00-24:00 | 0:00-24:00 | 8:00-21:00 |
| USE FEE | 100 YEN / 60 MINUTES | NO CHARGE | 200 YEN / 60 MINUTES | 150 YEN / 60 MINUTES |
| VACANT SPACE PROBABILITY | 0.66 | 0.50 | 0.82 | 0.40 |
| USER RESTRICTIONS | NO | NO | NO | NO |
| ... | ... | ... | ... | ... |

NAVIGATION DEVICES, METHODS AND PROGRAMS

INCORPORATION BY REFERENCE

The disclosure of Japanese Patent Application No. 2007-340794, filed on Dec. 28, 2007, including the specification, drawings and abstract, is incorporated herein by reference in its entirety.

BACKGROUND

1. Related Technical Fields

Related technical fields include navigation devices, methods and programs that search for and find a route to a destination.

2. Related Art

In recent years, a navigation device that provides driving guidance and makes it easy for a driver to arrive at a desired destination has been installed in many vehicles. The navigation device is a device that is capable of detecting a vehicle's current position with a GPS receiver or the like, acquiring map data that corresponds to the current position through a network or from a storage medium such as a DVD-ROM, a HDD, or the like, and displaying the map data on a liquid crystal monitor. The navigation device is also provided with a route search function that, when the desired destination is input, searches for an optimum route from the vehicle's position to the destination. The navigation device then displays the guidance route on a display screen and reliably guides the driver to the desired destination by providing guidance by voice in situations such as when the vehicle approaches an intersection. In addition, some navigation devices have a function that provides guidance to parking sites near the vehicle's current position or in the vicinity of the destination.

For example, in Japanese Patent Application Publication No. JP-A-2001-349740, a technology is described that searches data pertaining to parking sites for parking sites at or near a destination that the user has input, then from among the search results, displays the parking sites that match what the user wants. These may be the parking sites that are available at a specified date and time, or the parking sites that match conditions such as the vehicle width, the vehicle height, and the model of the user's vehicle. The technology also acquires congestion information and vacancy information for the parking sites. A technology is also described that searches for a route from the vehicle's current position to the displayed parking site and that displays the recommended route on a display.

The technology that is described in Japanese Patent Application Publication No. JP-A-2001-349740 searches for a route to a parking site that is provided within a specified area that is off of the street. However, so-called on-street parking zones that are formed on-street are also provided in addition to the parking sites that are provided off-street.

On-street parking zones are parking zones that are provided on the street. On-street parking zones are seen especially often in the cities of Europe and North America, and parking in the on-street parking zones is very common.

SUMMARY

However, the route searching that is performed by the technology that is described in Japanese Patent Application Publication No. JP-A-2001-349740 does not take the on-street parking zones into account. Furthermore, the technology that is described in Japanese Patent Application Publication No. JP-A-2001-349740 computes the route using the off-street parking sites as points along the way to the destination. The route to the destination is merely a combination of a plurality of routes to each of the points along the way to the destination (for example, a route from the departure point to the parking site and a route from the parking site to the destination).

Therefore, a look at the entire route to the final destination often reveals instances of circuitous routes and routes that travel in both directions on the same road.

Furthermore, the user has to select the parking site in which to park from among the plurality of the parking sites in the vicinity of the destination. Therefore, the selected parking site is not necessarily the optimum parking site for the user, and the set route to the parking site may include one-way streets, congested areas, and the like.

Moreover, because the on-street parking zones are provided on the street, it is difficult for drivers who are not familiar with the streets, such as travelers and the like, to search for and find a parking space.

Exemplary implementations of the broad inventive principles described herein provide a navigation device, method and program that are capable of searching for and finding a route that includes on-street parking zones in the vicinity of the destination.

Exemplary implementations provide navigation devices, methods, and programs that set a destination, find an on-street parking zone that is in the vicinity of the destination, and find a route, by modifying a search cost for a road, that will arrive at the destination by way of a road on having the on-street parking zone. The devices, methods, and programs acquire parking information that pertains to the on-street parking zone and find the route by modifying the search cost based on the parking information. The devices, methods, and programs find the route when the vehicle has reached a specified distance from the destination.

BRIEF DESCRIPTION OF THE DRAWINGS

Exemplary implementations will now be described with reference to the accompanying drawings, wherein:

FIG. 3 is an example of facility data that pertain to on-street parking zones and are stored in a map information data base;

FIG. 4 is an exemplary cost factor determination table that is based on use fees;

FIG. 5 is an exemplary cost factor determination table that is based on a distance to a destination;

FIG. 6 is an exemplary flowchart of a guidance route setting method;

FIG. 9 is an example of an on-street parking zones list;

FIG. 13 is an exemplary figure that shows an example of an en route list;

DETAILED DESCRIPTION OF EXEMPLARY IMPLEMENTATIONS

Figure 1:
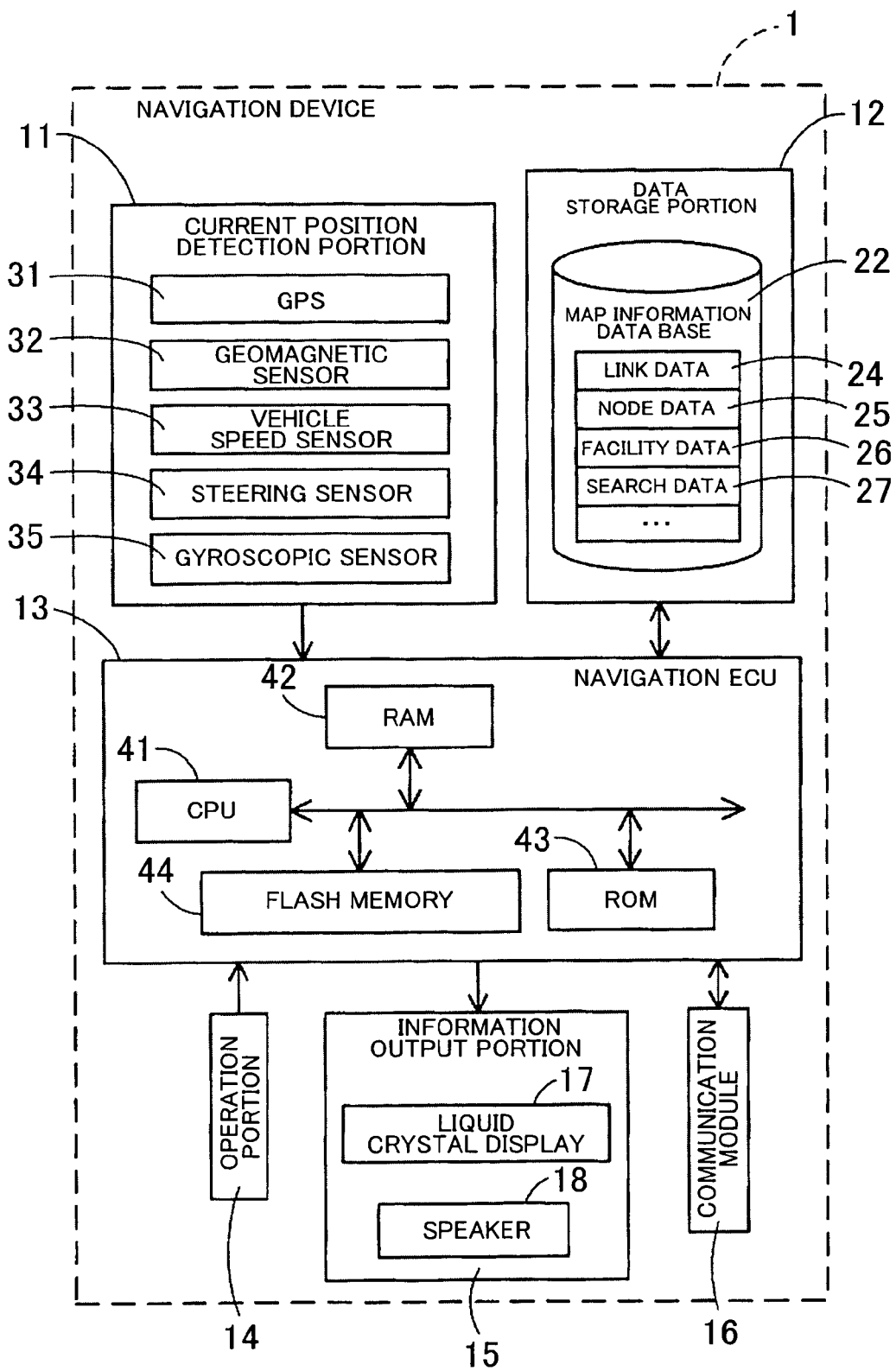
FIG. 1 is a block diagram that shows an exemplary navigation device.

FIG. 1 is a block diagram that shows the navigation device 1 according to the present example. As shown in FIG. 1, an exemplary navigation device 1 is configured from a current position detection portion 11, a data storage portion 12, a navigation electronic control unit (ECU) (controller) 13, an operation portion 14, an information output portion 15, and a communication module 16. The current position detection portion 11 detects the current position of the vehicle. The data storage portion 12 stores various types of data. The navigation ECU 13 (a destination setting unit, an on-street parking zone search unit, a route search unit, an information acquisition unit, an arrival time prediction unit, a parking zone specification unit) performs various types of computational processing based on information that is input. The operation portion 14 accepts an operation from an operator. The information output portion 15 outputs various types of information that pertain to map information, a guidance route, and on-street parking zones. The communication module 16 performs communication with information centers such as a traffic information center and the like.

Figure 2:
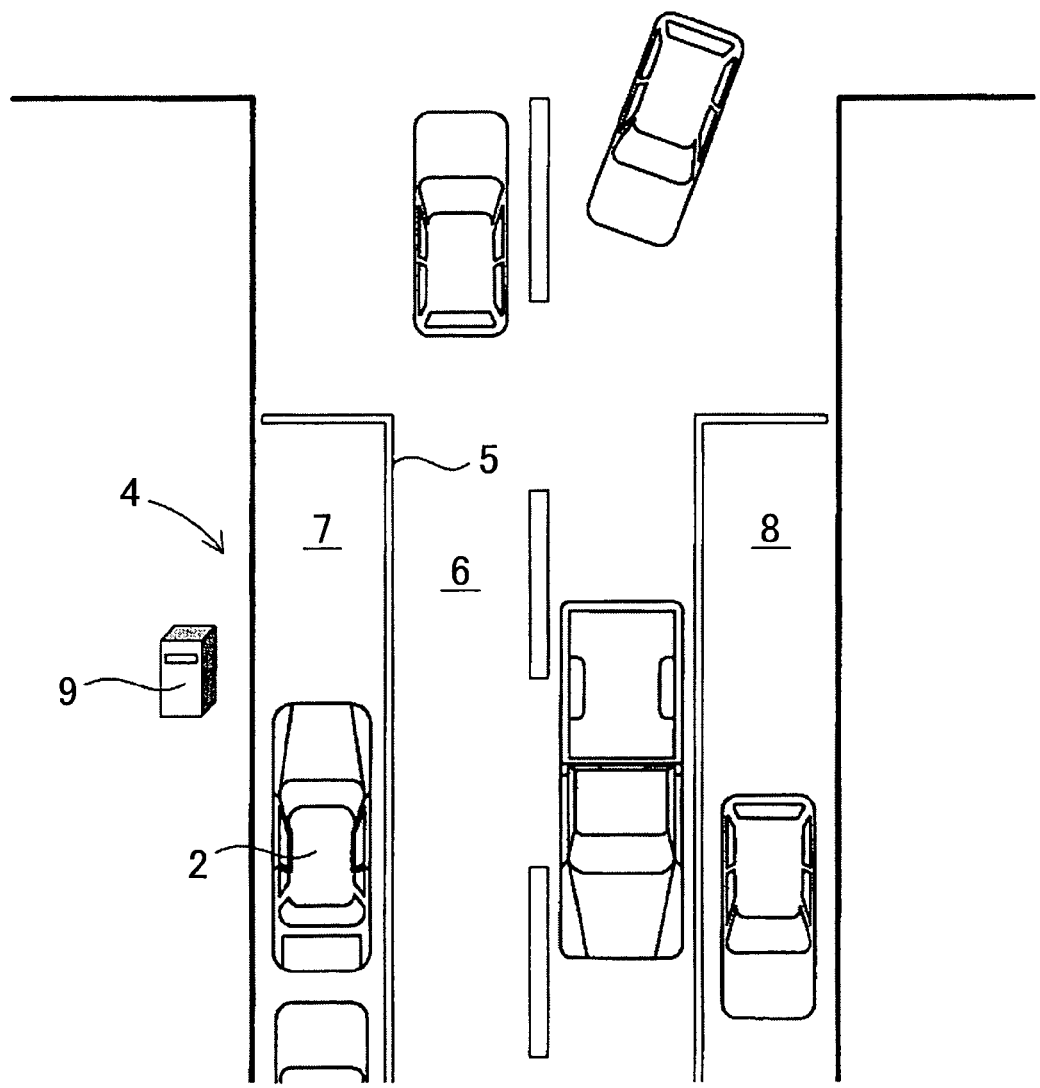
FIG. 2 is an example of on-street parking zones that are provided in roadside strips along both sides of a two-lane street.

As shown in FIG. 2, on-street parking zones 4 are provided in roadside strips along both sides of a two-lane street. The street where the on-street parking zones 4 are provided is divided by boundary lines 5, which are white lines or the like, into a two-lane driving area 6 in which the vehicle 2 travels and available parking spaces 7, 8. That is, the areas that are enclosed by the boundary lines 5 are the available parking spaces 7, 8 of the on-street parking zones 4. Note that in the on-street parking zones 4 shown in FIG. 2, the available parking spaces 7, 8 are respectively provided in the roadside strips on the left and right sides of the street, but a parking zone may also be provided in a roadside strip on only one side of the street.

A parking meter 9 is installed near the parking available spaces 7, 8. A user of the on-street parking zones 4, after parking a vehicle 2 in one of the available parking spaces 7, 8, may, for example, obtain a parking stub by inserting a specified amount of money into the parking meter 9. The user can park in the on-street parking zones 4 for a specified period of time by placing the obtained parking stub on the parked vehicle 2.

Note that on-street parking zones are marked areas on the surface of roads where parking is allowed. The on-street parking zones are also called parking bays, parking zones, surface parking zones, street parking zones, road shoulder parking zones, and limited time parking zones.

With known technologies for the on-street parking zone described above, the problems described below have occurred.

First, the on-street parking zone has the characteristic of being provided along the street. Therefore, in a search for a route to the on-street parking zone, unlike a search for a route to a parking site that is formed into a point and is provided in an off-street location, it is necessary to take into account the form of the link on which the on-street parking zone is provided, as well as the direction of travel on the link.

Second, the parking regulations for the on-street parking zone are frequently more complex than for the off-street parking site. For example, the hours when parking is permitted, a use fee, what vehicles are eligible for parking, and the like are frequently determined in advance. Therefore, in a case where a traveler or the like wants to park in the on-street parking zone, it is difficult to determine whether or not it is possible to park in the on-street parking zone. It is also difficult to determine what on-street parking zone is appropriate for parking.

Each of the configuring elements of the navigation device 1 will be explained in order below.

The current position detection portion 11 includes a GPS 31, a geomagnetic sensor 32, a vehicle speed sensor 33, a steering sensor 34, a gyroscopic sensor 35, an altimeter (not shown in the drawings), and the like, and is capable of detecting the vehicle's current position, heading, running speed, and the like. The vehicle speed sensor 33, in particular, is a sensor for detecting the vehicle's speed and distance traveled. The vehicle speed sensor 33 generates a pulse in response to the rotation of the vehicle's wheels and outputs a pulse signal to the navigation ECU 13. The navigation ECU 13 counts the generated pulses to compute the revolution speed of the wheels and the distance traveled. Note that it is not necessary for the navigation device 1 to be provided with all of the five types of sensors described above, and it is acceptable for the navigation device 1 to be provided with only one or a plurality among the five types of sensors.

The data storage portion 12 includes a hard disk (not shown in the drawings) as an external storage device and a storage medium, as well as a recording head (not shown in the drawings). The recording head serves as a driver for reading a map information data base 22, specified programs, and the like that are stored on the hard disk and for writing specified data to the hard disk.

The map information data base 22 stores various types of map data that are necessary for route guidance, traffic information guidance, and map displays. Specifically, the map data includes link data 24 that pertains to the forms of roads (links), node data 25 that pertains to node points, facility data 26 that pertains to facilities, search data 27 for searching for routes, intersection data that pertains to various intersections, search data for searching for geographical points, image drawing data for drawing images of maps, roads, traffic information, and the like on a liquid crystal display 17, and the like.

The link data 24 includes link lengths for each link that is included in a road, as well as data on the road to which each link belongs, such as the width, the slope, the cant, and the bank of the road, the state of the road surface, the number of lanes in the road, locations where the number of lanes decreases, locations where the road width narrows, crosswalks, and the like. The link data 24 also includes data that pertains to corners, such as the radii of curvature, intersections, T intersections, entrances to and exits from the corners, and the like. The link data 24 also includes data that pertain to road attributes, such as downhill roads, uphill roads, and the like. The link data 24 also includes data that pertain to road types, such as ordinary roads like national routes, prefectural routes, city streets, and the like, as well as toll roads like national expressways, urban expressways, ordinary toll roads, toll bridges, and the like. In addition, the link data 24 includes data that pertain to toll roads, such as data on roads (ramps) for toll road entrances and exits, toll plazas (interchanges), and the like.

The node data 25 includes data on branching points in actual roads (including intersections, T intersections, and the like), the coordinates (locations) of node points that are set at specified intervals according to the radii of curvature and the like of various roads, node attributes that indicate whether nodes correspond to intersections or the like, connecting link number lists that list the link numbers of the links that connect to the nodes, linked node number lists that list the node numbers of nodes that are linked to one another through links, data that pertain to the heights (elevations) of various node points, and the like.

The facility data 26 includes data that pertains to various types of facilities, such as hotels, hospitals, gas stations, parking locations, including on-street parking zones, tourist facilities, restaurants, service areas, and the like in various regions. As shown in FIG. 3, the facility data that pertain to an on-street parking zone include an identification ID that identifies the on-street parking zone, a link ID of the link on which the on-street parking zone is provided, an hours available that indicates the hours when the user can use the on-street parking zone, a use fee that is required when using the on-street parking zone, location coordinates that indicate the location of the on-street parking zone, a vacant space probability that indicates a predicted state of parking space availability, user restrictions that indicate restrictions on who can use the on-street parking zone, and the like. Note that for an on-street parking zone for which the use fee varies according to the time slot (for example, 9:00 to 12:00, 12:00 to 21:00), a use fee is stored for each time slot. Note also that the location coordinates that are stored include the coordinates of the point where the on-street parking zone starts and the coordinates of the point where the on-street parking zone ends. When the on-street parking zone is provided over the entire length of a link, the location coordinates are the coordinates of both ends of the link. The vacant space probability is a value that is computed based on past parking circumstances in the on-street parking zone and is equivalent to the ratio of vacant spaces to the total number of parking spaces in the on-street parking zone. Note that the current parking circumstances in the on-street parking zone may also be acquired from a center, and the vacant space probability may be computed based on the acquired current parking circumstances. Accumulated vacancy information for the parking spaces may also be stored for each day of the week and each time slot, and the vacant space probability may be computed and stored for each day of the week and each time slot, based on statistical results for the accumulated vacancy information. The user restrictions include various types of conditions such as "no restrictions," "residents only," "handicapped only," and the like.

For example, in the facility data shown in FIG. 3, the information that is stored for an on-street parking zone A indicates that the zone is located from ($x1$, $y1$) to ($x2$, $y2$) on a link with the link ID 000001, that the zone can be used at no charge from 0:00 to 24:00, with no user restrictions, and that the vacant space probability is 0.42. The information that is stored for an on-street parking zone B indicates that the zone is located from ($x3$, $y3$) to ($x4$, $y4$) on a link with the link ID 002468, that the zone can be used at a charge of 700 yen per 60 minutes from 0:00 to 24:00, with no user restrictions, and that the vacant space probability is 0.45. The same sort of information is also stored for the other on-street parking zones.

The search data 27 include data that are used to search for and display a route to a destination that has been set. Specifically, the search data 27 include cost data, route display data, and the like. The cost data are used to compute search costs and include data on the cost of passing through a node (hereinafter called the "node cost") and data on the cost of driving each link that is included in a road network (hereinafter called the "link cost"). The route display data are used to display a route that is selected by a route search on a map on the liquid crystal display 17.

The node cost is basically computed for a node that corresponds to an intersection, and its value is computed according to the vehicle's driving path when it passes through the intersection (that is, straight ahead, right turn, or left turn), the presence or absence of a traffic signal, the number of lanes, and the like.

The link cost, on the other hand, is computed for each link that is included in a road network, and its value is computed according to the length of the link, the presence or absence of an on-street parking zone (as well as the parking conditions and the like in a case where an on-street parking zone is present), the road attributes, the road type, the road width, the number of lanes, and the like.

An exemplary method for computing the link cost, particularly for a link that includes an on-street parking zone, will be explained below. The exemplary method may be implemented, for example, by one or more of the above-described components. For example, the exemplary method may be implemented by the navigation ECU 13 of the navigation device 1 executing a computer program stored in ROM 43. However, even though the exemplary structure may be referenced in the description, it should be appreciated that the structure is exemplary and the exemplary method need not be limited by any of the above-described exemplary structure.

In a case where the user wants to park in an on-street parking zone, the link cost for a link that is among the various links in the road network and that includes an on-street parking zone is computed using an ordinary cost factor and a parking cost factor. The ordinary cost factor is prescribed according to the road attributes, the road type, the road width, the number of lanes, and the like. The parking cost factor is computed based on information that pertains to the on-street parking zone. In other words, the link cost is computed by taking the basic link cost that is computed according to the link length and multiplying it by the ordinary cost factor and the parking cost factor. Note that the parking cost factor is computed by Equation 1 below.

Parking cost factor=Use fee cost factor×Distance cost factor×(1−Vacant space probability)

The use fee cost factor is determined based on the use fee that is required when using the on-street parking zone. FIG. 4 is a figure that shows a cost factor determination table that is based on use fees. Specifically, as shown in FIG. 4, if the use fee is "No charge," the cost factor is determined to be 0.5. If the use fee is 1 to 10 yen per minute, the cost factor is determined to be 0.6. If the use fee is 11 yen to 20 yen per minute, the cost factor is determined to be 0.7. If the use fee is 21 yen to 30 yen per minute, the cost factor is determined to be 0.8. If the use fee is 31 yen to 50 yen per minute, the cost factor is determined to be 0.9. If the use fee is 51 yen or higher per minute, the cost factor is determined to be 1.0.

The distance cost factor is determined based on the distance to the destination that is set by the user. FIG. 5 is a figure that shows a cost factor determination table that is based on the distance to the destination. Specifically, as shown in FIG. 5, if the distance to the destination is 0 meters to 50 meters, the cost factor is determined to be 0.6. If the distance to the destination is 51 meters to 100 meters, the cost factor is determined to be 0.7. If the distance to the destination is 101 meters to 500 meters, the cost factor is determined to be 0.8.

If the distance to the destination is 501 meters to 1000 meters, the cost factor is determined to be 0.9. If the distance to the destination is 1001 meters or longer, the cost factor is determined to be 1.0.

Note that the distance to the destination is computed based on the straight-line distance between the location coordinates of the destination that is set by the user and the location coordinates of the on-street parking zone (refer to FIG. 3). The distance may also be computed as the distance that would be traveled if the links to the on-street parking zone were followed instead of as the straight-line distance.

The parking cost factor may also be computed using Equation 2 below.

$$\text{Parking cost factor} = \alpha \times C1 \times \beta \times C2 \times \gamma \times C3 \times \epsilon \times C4$$

(where $\alpha$, $\beta$, $\gamma$, and $\epsilon$ are adjustment factors)

In this case, C1 is a factor that is based on the distance to the destination. To be specific, a number (1, 2, 3, ... n) is first assigned to each of the on-street parking zones that are located in the vicinity of the destination, within a specified distance from the destination, or within search blocks in the vicinity that include a search block where the destination is located, in the order of their proximity to the destination. Then for the i-th on-street parking zone, the factor C1($i$) is defined as i/n.

C2 is a factor that is based on the distance over which parking is possible, that is, on the length of the on-street parking zone. To be specific, an on-street parking zone length L is first computed for each of the on-street parking zones that are located in the vicinity of the destination, and a minimum value Lmin is found. Note that the on-street parking zone length L is computed based on the shape of the link on which the on-street parking zone is provided and on the location coordinates of the on-street parking zone (refer to FIG. 3). Then, if the length of the i-th on-street parking zone is defined as L(i), the factor C2($i$) for the i-th on-street parking zone is defined as 1/(L(i)/Lmin).

C3 is a factor that is based on the vacant space probability. To be specific, if the vacant space probability for the i-th on-street parking zone is defined as P(i), the factor C3($i$) for the i-th on-street parking zone is defined as 1−P(i).

C4 is a factor that is based on a continuousness of the on-street parking zone, that is, the number of a plurality of links over which the on-street parking zone stretches continuously. To be specific, in a case where an on-street parking zone is provided on a link that leads into the link on which the i-th on-street parking zone is provided, $C4_B(i)$ is defined as equal to KB (where KB is greater than zero and less than 1). On the other hand, in a case where an on-street parking zone is not provided on a link that leads into the link on which the i-th on-street parking zone is provided, $C4_B(i)$ is defined as 1. Furthermore, in a case where an on-street parking zone is provided on a link that leads out of the link on which the i-th on-street parking zone is provided, $C4_A(i)$ is defined as equal to KA (where KA is greater than zero and less than 1). On the other hand, in a case where an on-street parking zone is not provided on a link that leads out of the link on which the i-th on-street parking zone is provided, $C4_A(i)$ is defined as 1. The factor C4 for the i-th on-street parking zone is defined as $C4_B(i) \times C4_A(i)$.

In the navigation device 1 according to the present example, in the search for a route to the destination, the navigation ECU 13 computes a total cost value that is the sum of the search costs (the node costs and the link costs) for each of all the routes from the departure point to the destination, as determined by the Dykstra method. The route that has the lowest total cost value is set as the guidance route. Particularly in a case where the user wants to park in an on-street parking zone, the navigation ECU 13 also computes the total cost value using the link costs that have been multiplied by the parking cost factors for the links on which on-street parking zones are provided.

The navigation ECU 13 is an electronic control unit that performs overall control of the navigation device 1, including guidance route setting processing that sets the guidance route from the current position to the destination in a case where the destination has been selected, driving guidance processing that provides guidance for driving in accordance with the set guidance route, and the like. The navigation ECU 13 includes a controller (e.g., CPU 41), as well as a RAM 42, a ROM 43, and a flash memory 44 as internal storage devices. The CPU 41 serves as a computational device and a control device. The RAM 42 is used as a working memory for the various types of computational processing that the CPU 41 performs, and it also stores route data when a route has been found, an on-street parking zones list that will be described later (FIG. 9), and the like. The ROM 43 stores programs for controlling the various types of devices that are included in the navigation device 1. The flash memory 44 stores programs that are read from the ROM 43, a guidance route setting processing program (refer to FIG. 6), a driving guidance processing program (refer to FIG. 12), and the like.

The operation portion 14 is operated at times such as when the destination is input as a guidance end point and includes a plurality of operation switches (not shown in the drawing), such as various types of keys, buttons, and the like. Based on switch signals that are output by operating the various operation switches, such as by pressing or the like, the navigation ECU 13 controls the various types of corresponding operations that are executed. Note that the operation portion 14 can also be configured as a touch panel that is provided on the front surface of the liquid crystal display 17. In some cases, the operation portion 14 is also used to input a departure point as a guidance start point.

The information output portion 15 is configured from the liquid crystal display 17, a speaker 18, and the like, and outputs for the user various types of information that pertain to a map of the area around the vehicle, the guidance route, and the on-street parking zones.

The liquid crystal display 17 that is included in the information output portion 15 is provided in the center console or on the instrument panel surface in the vehicle's passenger cabin, and it displays a map image that includes a road, traffic information, operation guidance, an operation menu, guidance to the keys, the guidance route from the current position to the destination, guidance information along the guidance route, news, a weather forecast, the current time, e-mail, a television program, and the like. In addition, when the vehicle approaches an on-street parking zone, the liquid crystal display 17 displays information items that pertain to the on-street parking zone (the location of the on-street parking zone, the hours when the zone can be used, the use fee, the vacant space probability, the user restrictions, and the like).

The speaker 18 that is included in the information output portion 15 outputs traffic information guidance and voice guidance that guides driving along the guidance route, based on a command from the navigation ECU 13.

The communication module 16 is a communication device, such as a mobile telephone or a DCM, for example, that receives traffic information that is transmitted from a traffic information center, such as the Vehicle Information and Communication System (VICS (registered trademark)) center, a probe center, or the like, for example. The traffic information includes various types of information, such as congestion information, regulatory information, parking site information, traffic accident information, and the like.

The navigation device 1 may also include a DVD drive. The DVD drive is a drive that is capable of reading data that is recorded in a recording medium such as a DVD, a CD, or the like. The map information data base 22 is updated and the like based on the data that is read.

An exemplary guidance route setting method will be explained based on FIG. 6. The exemplary method may be implemented, for example, by one or more of the above-described components of the navigation device 1. For example, the exemplary method may be implemented by the navigation CPU 41 of the navigation device 1 executing a computer program stored in ROM 43. However, even though the exemplary structure may be referenced in the description, it should be appreciated that the structure is exemplary and the exemplary method need not be limited by any of the above-described exemplary structure.

As shown in FIG. 6, the guidance route setting method is executed when a destination setting operation is performed by the user, and it searches for routes from a departure point to the destination and sets the guidance route.

In the guidance route setting method, the CPU 41 first sets the destination based on operation information of the operation portion 14 at step (hereinafter abbreviated as "S") 1.

At S2, the CPU 41 performs processing that determines whether or not the user wants to park in an on-street parking zone in the vicinity of the destination. Specifically, the CPU 41 outputs a voice or a text that asks, "Do you want to park in an on-street parking zone?" and makes the determination based on a selection operation by the user. Note that the processing at S2 is not necessarily required as a configuration of the present invention, and a configuration may be used in which the processing at S2 is not performed.

The processing at S2 may also be configured such that it allows the user to select an on-street parking zone for which he wants guidance other than confirming the user's intention to park in an on-street parking zone. For example, the processing may be configured such that it displays a list of the on-street parking zones in the vicinity of the destination on the liquid crystal display 17 and allows the user to select an on-street parking zone.

The processing may also allow the user to select, in advance, conditions for an on-street parking zone for which the user wants guidance. For example, the processing may be configured such that it displays a plurality of conditions on the liquid crystal display 17, such as "for fee," "no charge," "either for fee or no charge is OK," and the like, and allows the user to select one.

Next, at S3, the CPU 41 acquires the current position of the vehicle (that is, the departure point). Specifically, the current position of the vehicle is first detected by the GPS 31, and map matching processing is then performed that specifies the current position of the vehicle on a map, based on map information that is stored in the map information data base 22.

Next, at S4, the CPU 41 executes a parking zone search method (FIG. 7) that will be described later. Note that the parking zone search method searches for an on-street parking zone (refer to FIG. 2) that is in the vicinity of the destination that was set at S1, then determines whether or not the on-street parking zone is suitable for parking.

Next, at S5, the CPU 41 executes a route search method (FIG. 8) that will be described later. Note that the route search method uses the Dykstra method to search for routes from the departure point that was acquired at S3 to the destination that was set at S1, then computes the total cost value for each route.

Next, at S6, the CPU 41 specifies the route that has the lowest total cost value, based on the results of the route search processing at S5, and sets that route as the guidance route. Note that the processing may also display on the liquid crystal display 17, as guidance route candidates, a plurality of the routes for which the total cost value is low, then set the route that is selected by the user to be the guidance route.

Next, the parking zone search method at S4 will be explained based on FIG. 7. The exemplary method may be implemented, for example, by one or more of the above-described components of the navigation device 1. For example, the exemplary method may be implemented by the navigation CPU 41 of the navigation device 1 executing a computer program stored in ROM 43. However, even though the exemplary structure may be referenced in the description, it should be appreciated that the structure is exemplary and the exemplary method need not be limited by any of the above-described exemplary structure.

First, at S11, the CPU 41 initializes the on-street parking zones list that is stored in the RAM 42. Note that the on-street parking zones list, as shown in FIG. 9, is a storage area where various types of information about the on-street parking zones that are stored in the facility data 26 of the map information data base 22 are stored for use in the route search.

Next, at S12, the CPU 41 searches for an on-street parking zone based on the facility data 26 of the map information data base 22 and acquires information that pertains to the on-street parking zone that will be the object of the processing at S13 to S15 below.

Next, at S13, the CPU 41 computes the straight-line distance from the on-street parking zone to the destination based on the location coordinates of the destination and the location coordinates of the on-street parking zone that were acquired at S12. Note that the distance may also be computed as a distance that follows the shapes of the links instead of as the straight-line distance. The processing may also compute the arrival time at (the distance to) the destination if the user parks in the on-street parking space and walks to the destination. The processing may also be configured such that driving guidance is provided by the driving guidance method (FIG. 12), which is described later.

Next, at S14, the CPU 41 determines whether or not the distance from the on-street parking zone to the destination that was computed at S13 is within a specified distance (for example, two kilometers). In a case where it is determined that the distance from the on-street parking zone to the destination is within the specified distance (YES at S14), the processing proceeds to S15. On the other hand, in a case where it is determined that the distance from the on-street parking zone to the destination is not within the specified distance (NO at S14), it is determined that the on-street parking zone does not meet the specified conditions for the current route search, and the processing proceeds to S17. Note that processing that determines whether or not the on-street parking zone is within search blocks in the vicinity that include a search block where the destination is located may also be executed instead of the processing at S14.

At S15, the CPU 41 computes the parking cost factor for the on-street parking zone. Note that the parking cost factor is computed by Equation 1 based on (A) the distance from the on-street parking zone to the destination that was computed at S13, (B) the use fee for the on-street parking zone, and (C) the vacant space probability. The parking cost factor may also be computed by Equation 2 based on (A) the distance from the on-street parking zone to the destination that was computed at S13, (B) the distance over which parking is possible in the on-street parking zone, (C) the vacant space probability, and (D) the continuousness of the on-street parking zone.

Next, at S16, the CPU 41 stores in the on-street parking zones list the distance from the on-street parking zone to the destination that was computed at S13 and the parking cost factor for the on-street parking zone that was computed at S15 (refer to FIG. 9). Note that a value of 1 is stored as the parking cost factor for an on-street parking zone for which it was determined that the distance from the on-street parking zone to the destination is greater than a specified distance. Furthermore, even if the distance from the on-street parking zone to the destination is within the specified distance, a value of 1 is stored as the parking cost factor for an on-street parking zone that has user restrictions and an on-street parking zone for which the predicted arrival time is outside of the hours when the zone can be used. For example, in FIG. 9, the on-street parking zone X has user restrictions, so a value of 1 is stored as the parking cost factor.

Next, at S17, the CPU 41 determines whether or not the search has been completed for all of the on-street parking zones that are stored in the facility data 26 and whether or not the processing from S13 to S16 has been completed for all of the on-street parking zones that were found.

If the result of the determination is that the search has been completed for all of the on-street parking zones that are stored in the facility data 26 and that the processing from S13 to S16 has been completed for all of the on-street parking zones that were found (YES at S17), the processing proceeds to S18. On the other hand, if it is determined that the search has not been completed for all of the on-street parking zones that are stored in the facility data 26 or that the processing from S13 to S16 has not been completed for all of the on-street parking zones that were found (NO at S17), the processing returns to S12 and searches for the next on-street parking zone to serve as the object of the processing.

At S18, the CPU 41 refers to the parking cost factor for one of the on-street parking zones that are stored in the on-street parking zones list and determines whether or not the parking cost factor satisfies a specified condition. In this case, the specified condition is that the parking cost factor is not greater than a specified value (for example, 0.3). Note that the specified condition may also be that the parking cost factor is of at least a specified rank among all of the parking cost factors ranked from lowest to highest, that the distance from the destination is of at least a specified rank among all of the distances ranked from shortest to longest, that the vacant space probability is of at least a specified rank among all of the vacant space probabilities ranked from highest to lowest, or that there are no user restrictions (refer to FIG. 3).

In a case where it is determined that the parking cost factor satisfies the specified condition (YES at S18), it is determined that the on-street parking zone is an on-street parking zone that satisfies the specified condition for the current route search (hereinafter called a "condition-satisfying on-street parking zone"), and a guidance-eligible parking zone flag for the on-street parking zone is set to 1 (S19). The processing then proceeds to S22.

On the other hand, in a case where it is determined that the parking cost factor does not satisfy the specified condition (NO at S18), it is determined that the on-street parking zone is an on-street parking zone that does not satisfy the specified condition for the current route search, and the guidance-eligible parking zone flag for the on-street parking zone is set to zero (S20). Then the parking cost factor for the on-street parking zone is changed to 1, and the on-street parking zones list is updated (S21). This causes the link where the on-street parking zone is located whose parking cost factor does not satisfy the specified condition to be treated in the same manner as a link that does not have an on-street parking zone for the purpose of computing the link cost.

For example, in FIG. 9, an on-street parking zone B has a parking cost factor that is greater than 0.3 and does not satisfy the specified condition, so the parking cost factor is changed to 1. Note that the processing from S18 to S21 is equivalent to processing by a parking zone specification unit.

Next, at S22, the CPU 41 determines whether or not the processing from S18 to S21 has been completed for all of the on-street parking zones that are stored in the on-street parking zones list. In a case where it is determined that the processing from S18 to S21 has not been completed for all of the on-street parking zones (NO at S22), the processing returns to S18, and the processing from S18 onward is executed for a new on-street parking zone. On the other hand, in a case where it is determined that the processing from S18 to S21 has been completed for all of the on-street parking zones (YES at S22), the parking zone search processing is terminated, and the processing proceeds to S5. Note that the processing from S12 to S22 is equivalent to processing by an information acquisition unit.

Next, the route search method at S5 will be explained based on FIG. 8. The exemplary method may be implemented, for example, by one or more of the above-described components of the navigation device 1. For example, the exemplary method may be implemented by the navigation CPU 41 of the navigation device 1 executing a computer program stored in ROM 43. However, even though the exemplary structure may be referenced in the description, it should be appreciated that the structure is exemplary and the exemplary method need not be limited by any of the above-described exemplary structure.

First, at S31, the CPU 41 computes the link cost in the direction that leads to the destination for each of the links that is subject to the route search. The CPU 41 computes the link cost by taking the specified link cost that is based on the link length and multiplying it by each of the cost factors. Note that for a link that does not include an on-street parking zone, the cost factor that is used as a multiplier at S31 is the ordinary cost factor that is prescribed according to the road attributes, the road type, the road width, the number of lanes, and the like. For a link that does include an on-street parking zone, in a case where the user wants to park in an on-street parking zone, the specified link cost is multiplied by the ordinary cost factor, as well as by the parking cost factor that is computed by the parking zone search processing (FIG. 7). Thus the search cost is changed based on the parking information for the on-street parking zones.

On the other hand, in a case where the user does not want to park in an on-street parking zone, the specified link cost is multiplied only by the ordinary cost factor, in the same manner as for other links.

Note that in the present example, the link cost is multiplied by the parking cost factor without modification, but in a case where the link cost thus computed is too low, the parking cost factor may also be multiplied by either an across-the-board correction factor or individual correction factors for each variable that is used to compute the parking cost factor. This makes it possible to adjust the link cost such that the route search is performed more appropriately.

Thus, for a link that includes a condition-satisfying on-street parking zone, that is, for a link that includes an on-street parking zone whose parking cost factor satisfies the specified condition at S18 (for example, not greater than 0.3) and for which the guidance-eligible parking zone flag is set to 1, the link cost that is computed is lower than the link costs of other links. Therefore, when the search is conducted at S32 for a route to the destination, which is described later, there is a strong possibility that a guidance route will be set that includes the link.

Next, at S32, the CPU 41, using the link costs that were computed at S31, searches for a route from the departure point (the current position of the vehicle) to the destination that was set at S1. Note that in searching for the route to the destination, the navigation ECU 13 computes the total cost value that is the sum of the search costs (the node costs and the link costs) for each of all the routes from the departure point to the destination, as determined by the Dykstra method. Note that the route searching by the Dykstra method is a known technology, so the explanation of it will be omitted.

Next, at S33, the CPU 41 refers to the results of the route search at S31 and determines whether or not an on-street parking zone that satisfies the specified condition for the current route search is located on the route that has the lowest total cost value (hereinafter called the "recommended route"). That is, the CPU 41 determines whether or not the recommended route is a route that passes through a link that is provided with an on-street parking zone that satisfies the specified condition for the current route search.

In a case where it is determined that a condition-satisfying on-street parking zone is located on the recommended route (YES at S33), the processing proceeds to S6, and the recommended route is set as the guidance route. On the other hand, in a case where it is determined that a condition-satisfying on-street parking zone is not located on the recommended route (NO at S33), the processing proceeds to S34. However, in a case where the user does not want to park in an on-street parking zone, the processing proceeds to S6 without conducting the route search again, even in a case where it is determined that a condition-satisfying on-street parking zone is not located on the recommended route (NO at S33).

At S34, the CPU 41 refers to the distances from each of the on-street parking zones to the destination that were computed at S13 and specifies the condition-satisfying on-street parking zone that is provided in the location that is closest to the destination. Then, using the link costs that were computed at S31, the CPU 41 once again searches for a route that goes from the departure point (the current position of the vehicle) to the destination that was set at S1 via the road on which the specified on-street parking zone is located. Next, the recommended route is set as the guidance route (S6), based on the result of the route search at S34. Therefore, the guidance route that is set is a route that traverses a road on which a condition-satisfying on-street parking zone is provided in at least one location between the departure point and the destination. Note that the processing at S34 may be such that, instead of searching for a route that traverses the road on which is located the condition-satisfying on-street parking zone that is provided in the location that is closest to the destination, it searches for a route that traverses a road on which is located the on-street parking zone that has the lowest fee or the on-street parking zone that has the highest vacant space probability.

Figure 10:
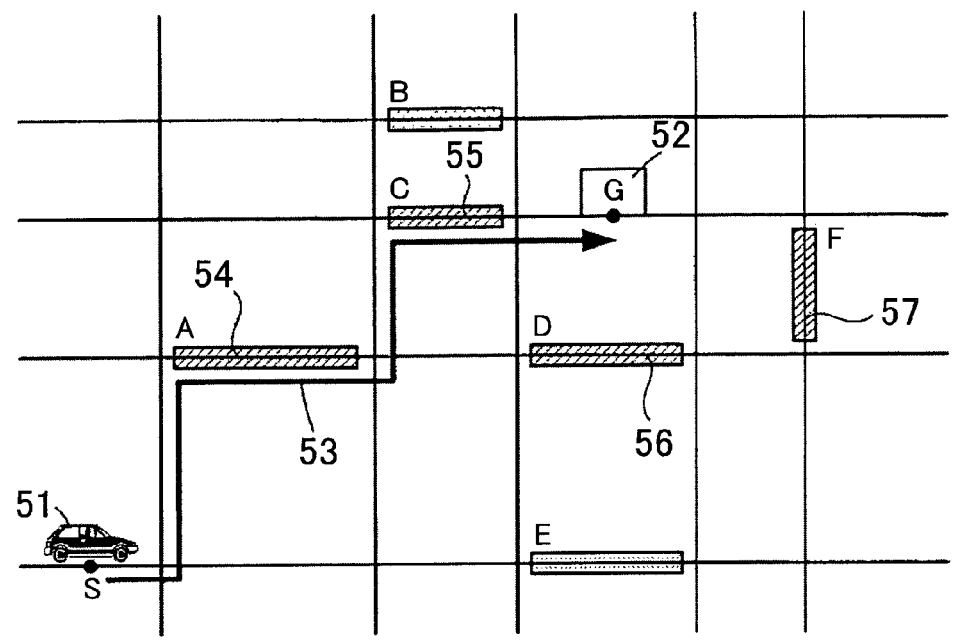
FIG. 10 is an example of a guidance route that is set in a case where a search is performed for a route from a departure point to a destination.
Figure 11:
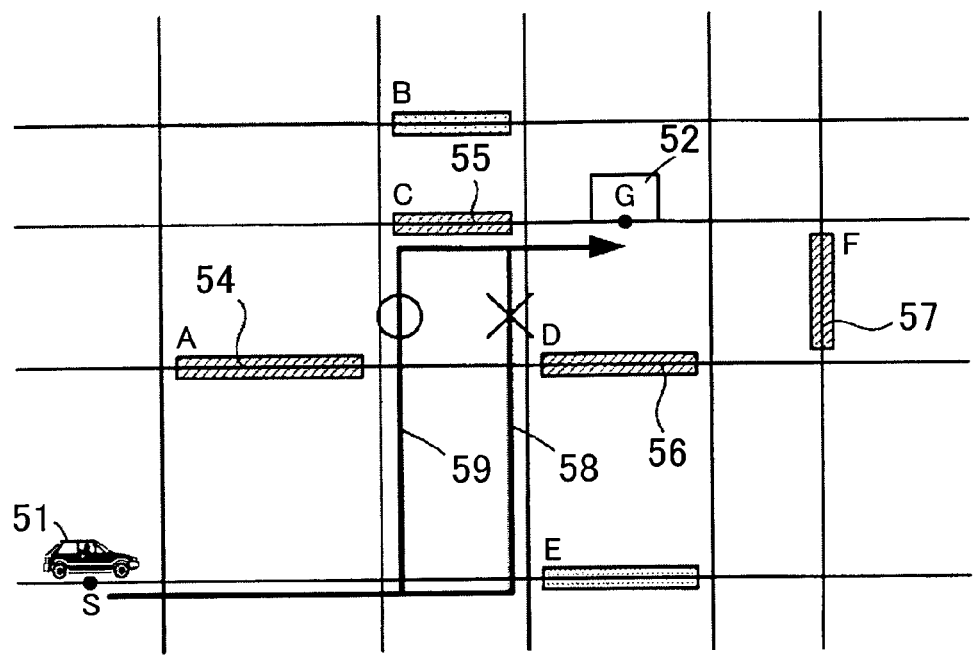
FIG. 11 is an example of a guidance route that is set in a case where a search is performed for a route from a departure point to a destination.

FIG. 10 and FIG. 11 are examples of guidance routes that are set in cases where searches are performed for a route from a departure point 51 to a destination 52.

In the area surrounding the destination 52 that is shown in FIG. 10 and FIG. 11, on-street parking zones A to F are provided in six locations. Furthermore, of the on-street parking zones A to F, the on-street parking zones A, C, D, and F are on-street parking zones that satisfy the specified condition for the route search. Therefore, the link costs that are computed in accordance with the parking cost factors are lower for a link 54 on which the on-street parking zone A is located, a link 55 on which the on-street parking zone C is located, a link 56 on which the on-street parking zone D is located, and a link 57 on which the on-street parking zone F is located than for the other links.

In a case like that shown in FIG. 10, where a route that traverses the link 54 and the link 55 is set as a guidance route 53, the guidance route 53 becomes a route that arrives at the destination 52 after passing by the on-street parking zone A and the on-street parking zone C. It is therefore possible for the driver, in the course of driving to the destination, to come near the on-street parking zone A and the on-street parking zone C that are in the area surrounding the destination. It is also possible for the driver to check the vacant space circumstances of each of the on-street parking zones and to park in the event that a vacant space is available.

On the other hand, in a case that shown in FIG. 11, where a route that does not pass by any of the condition-satisfying on-street parking zones is set as a guidance route 58, the route search is conducted again. When that is done, a route is found that definitely passes by the on-street parking zone C, which is the closest to the destination 52 of any of the on-street parking zones that satisfy the specified condition for the route search. In a case where a guidance route 59 that traverses the link 55 is set as a result of the second route search, the guidance route 59 is a route that arrives at the destination 52 after passing by the on-street parking zone C. It is therefore possible for the driver, in the course of driving to the destination, to come near the on-street parking zone C that is in the area surrounding the destination.

Figure 12:
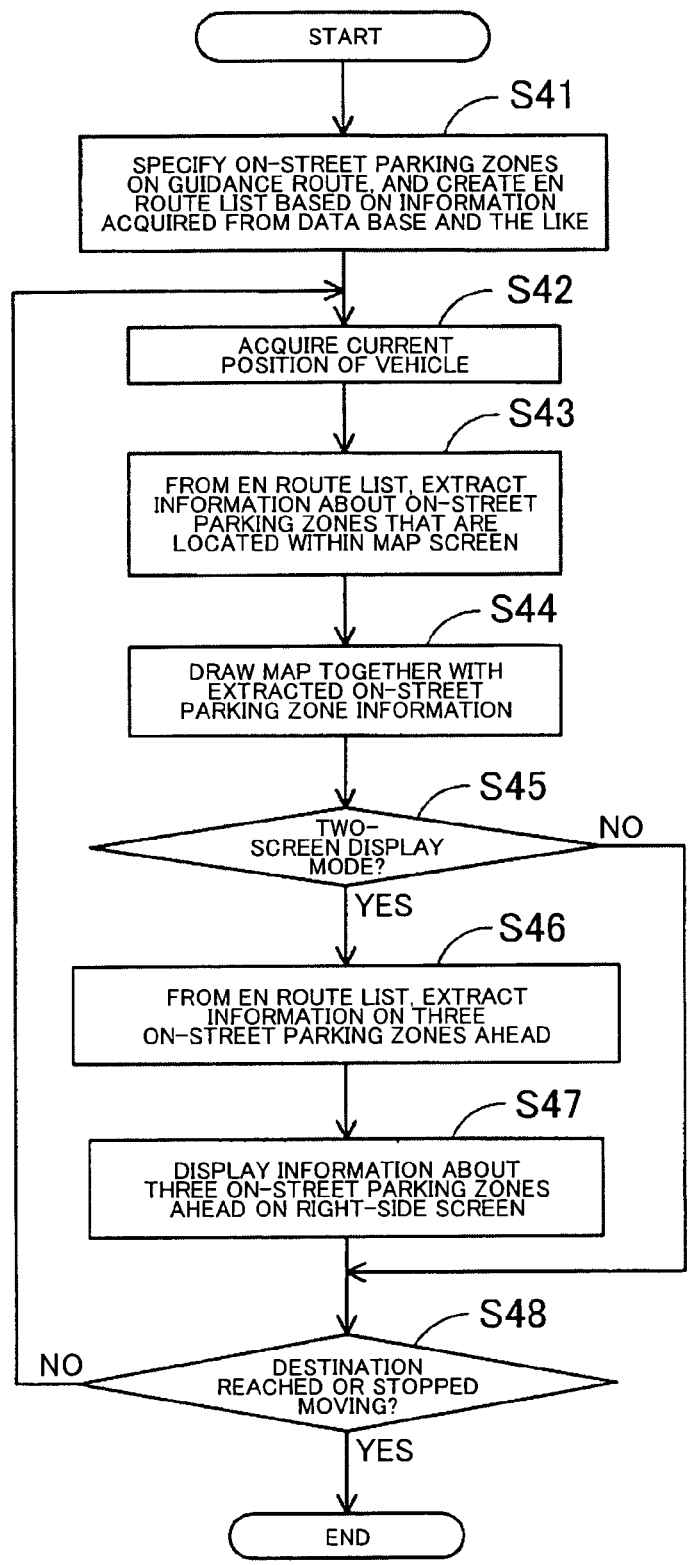
FIG. 12 is an exemplary flowchart of a driving guidance method.

Next, the driving guidance method will be explained based on FIG. 12. The exemplary method may be implemented, for example, by one or more of the above-described components of the navigation device 1. For example, the exemplary method may be implemented by the navigation CPU 41 of the navigation device 1 executing a computer program stored in ROM 43. However, even though the exemplary structure may be referenced in the description, it should be appreciated that the structure is exemplary and the exemplary method need not be limited by any of the above-described exemplary structure.

Figure 7:
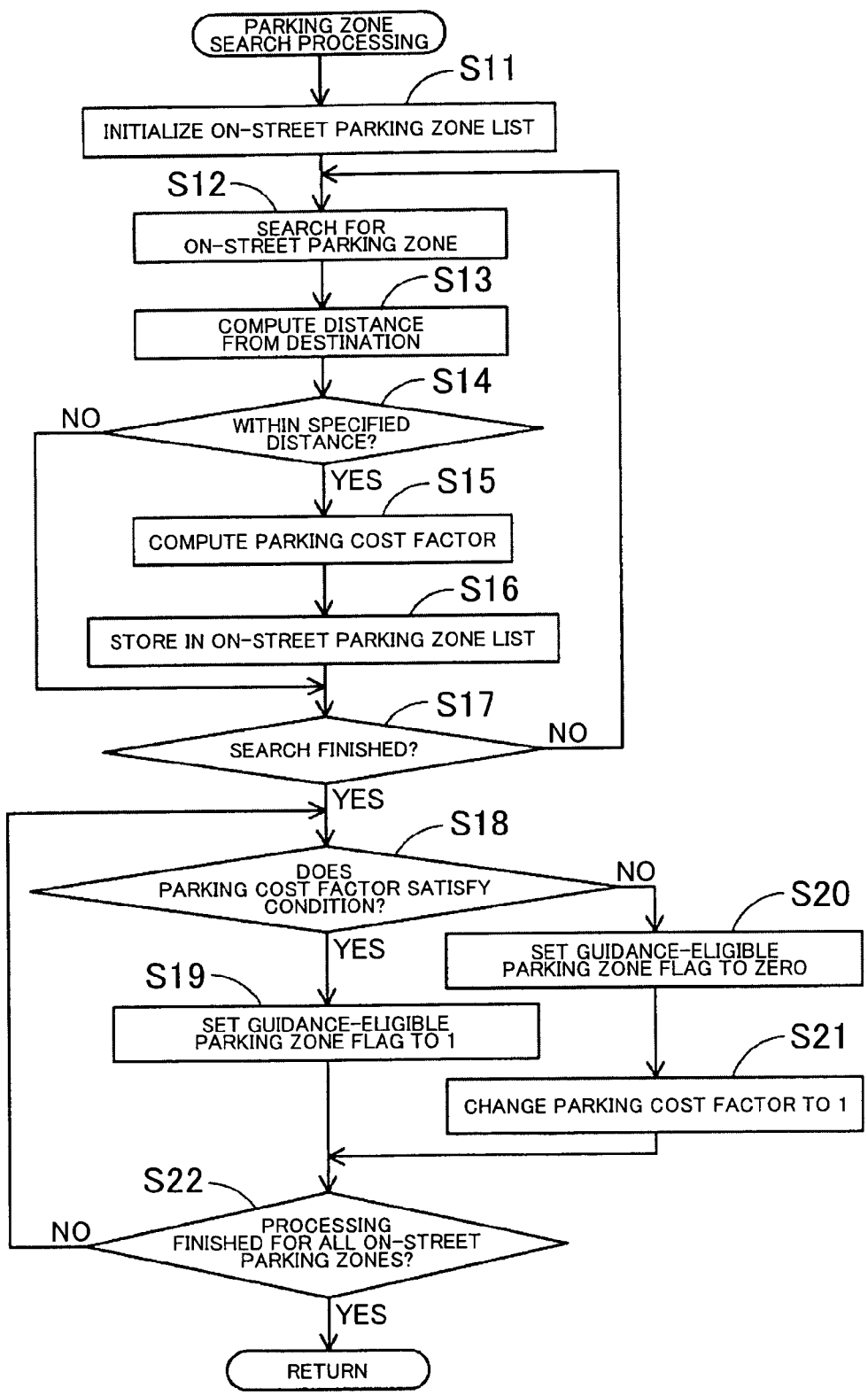
FIG. 7 is an exemplary flowchart of a parking zone search method.
Figure 8:
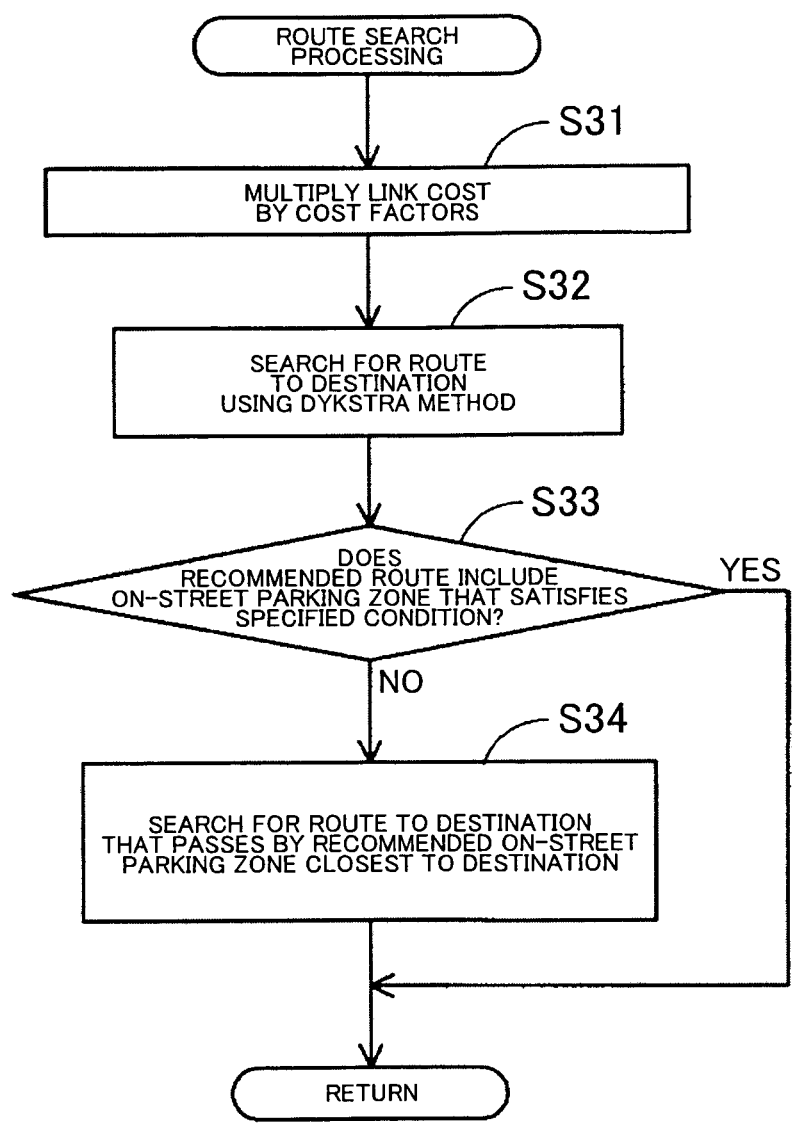
FIG. 8 is an exemplary flowchart of a search processing method.

The driving guidance method guides driving to the set destination according to the guidance route that was set by the guidance route setting method (FIGS. 6 to 8).

First, at S41 in the driving guidance method, the CPU 41 specifies all of the on-street parking zones that are located on the guidance route that was set by the guidance route setting method (FIGS. 6 to 8). The CPU 41 also acquires information that pertains to each of the specified on-street parking zones from the facility data 26 that is stored in the map information data base 22 (refer to FIG. 3) and from the on-street parking zones list (FIG. 9). The CPU 41 also creates an en route list based on the acquired information.

FIG. 13 is a figure that shows an example of the en route list that is created at S41. The en route list in FIG. 13 is created in a case where a guidance route is set that passes by four on-street parking zones.

As shown in FIG. 13, the information pertaining to each of the on-street parking zones that is stored in the en route list includes a sequence number that indicates the order in which the vehicle passes by the on-street parking zone when driving along the guidance route, a distance to the destination from the on-street parking zone, location coordinates that indicate the location of the on-street parking zone, an hours available that indicates the hours when the user can use the on-street parking zone, a use fee that is required when using the on-street parking zone, a vacant space probability that indicates a predicted state of parking space availability, user restrictions that indicate restrictions on who can use the on-street parking zone, and the like.

Next, at S42, the CPU 41 acquires the current position of the vehicle. Specifically, the current position of the vehicle is first detected by the GPS 31, and map matching processing is then performed that specifies the current position of the vehicle on a map, based on map information that is stored in the map information data base 22.

Next, at S43, the CPU 41 specifies the on-street parking zones that are located within a map screen that is displayed on the liquid crystal display 17, based on the current position of the vehicle that was acquired at S42, the reduction scale setting of the map that is displayed on the liquid crystal display 17, and the en route list that was created at S41. Then the CPU 41 extracts from the en route list the information that pertains to the specified on-street parking zones.

Next, at S44, the CPU 41 draws a map image of the area surrounding the current position on the liquid crystal display 17, together with the information pertaining to the on-street parking zones that was extracted at S43. Thus a driving guidance screen that guides the driver's driving along the guidance route is displayed on the liquid crystal display 17.

Figure 14:
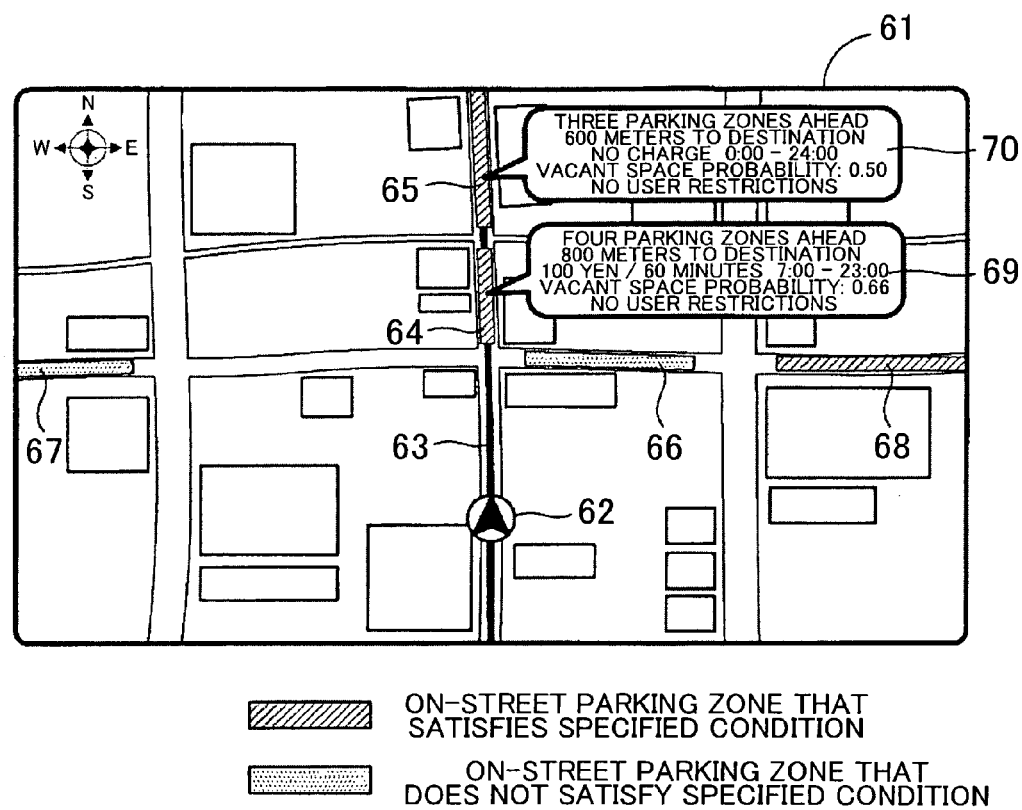
FIG. 14 is an exemplary figure that shows a driving guidance screen that is displayed on a liquid crystal display in the navigation device.

FIG. 14 is a figure that shows a driving guidance screen 61 that is displayed on the liquid crystal display 17 in the navigation device 1. The driving guidance screen 61 includes a vehicle position mark 62 that indicates the current position of the vehicle, a driving guidance route line 63 that is drawn along the guidance route on the map image, parking marks 64 to 68 that indicate the locations of on-street parking zones, and information windows 69, 70 that show information that pertains to the on-street parking zones.

Further, of the parking marks 64 to 68, those that correspond to the on-street parking zones that satisfy the specified condition of the current route search, as determined by the guidance route setting processing program (FIGS. 6 to 8), are highlighted in red. In contrast, the parking marks that correspond to the other on-street parking zones (that is, the on-street parking zones that it has been determined do not satisfy the specified condition) are displayed in blue. Note that the on-street parking zones for which the guidance-eligible parking zone flags are set to 1 are displayed as parking zones that satisfy the specified condition, and the on-street parking zones for which the guidance-eligible parking zone flags are set to zero are displayed as parking zones that do not satisfy the specified condition.

The information windows 69, 70 display, in the form of text, information that pertains particularly to those of the on-street parking zones displayed on the map that are located on the guidance route. Note that the content that is displayed includes information that indicates how many of the on-street parking zones that satisfy the specified condition lie ahead on the guidance route from the current position of the vehicle to the destination, information that pertains to the distance to the destination, information that pertains to the use fee, information that pertains to the hours when the on-street parking zone can be used, information that pertains to the vacant space probability, and information that pertains to the user restrictions.

In addition to the information described above, guidance may also be provided on the straight-line distance to the destination and on the arrival time at (the distance to) the destination in the event that the user parks in the on-street parking space and walks to the destination.

The current time may also be acquired by the GPS 31, and guidance may be provided on the vacant space probability that corresponds to the current time and on the use fee that corresponds to the current time. Guidance that corresponds to the current time may also be provided for an on-street parking zone for which the parking conditions will change based on information about the on-street parking zone. For example, guidance may be provided that says, "In another ten minutes, you can park in this parking zone at no charge."

Therefore, by referring to the driving guidance screen 61 that is displayed on the liquid crystal display 17, the user can obtain various types of information pertaining to the on-street parking zones that are located on the guidance route. In particular, based on the displayed locations and lengths of the parking marks 64 to 68, it is possible for the user to know the links where the on-street parking zones are provided, as well as the lengths of the on-street parking zones (that is, the distance over which parking is possible in each of the on-street parking zones). Moreover, by referring to the displayed colors of the parking marks 64 to 68, the user can easily understand whether or not a given on-street parking zone is an on-street parking zone that satisfies the specified condition.

Next, at S45, the CPU 41 determines whether or not the navigation device 1 is set to a two-screen display mode. In a case where the two-screen display mode is set (YES at S45), the processing proceeds to S46. On the other hand, in a case where an ordinary display mode is set (NO at S45), the processing proceeds to S48.

At S46, the CPU 41 extracts from the en route list information that pertains to the next three on-street parking zones that the vehicle will pass along the guidance route. Then, at S47, the CPU 41 displays the information that it extracted at S46 in the form of a list on a right-side screen on the liquid crystal display 17.

Figure 15:
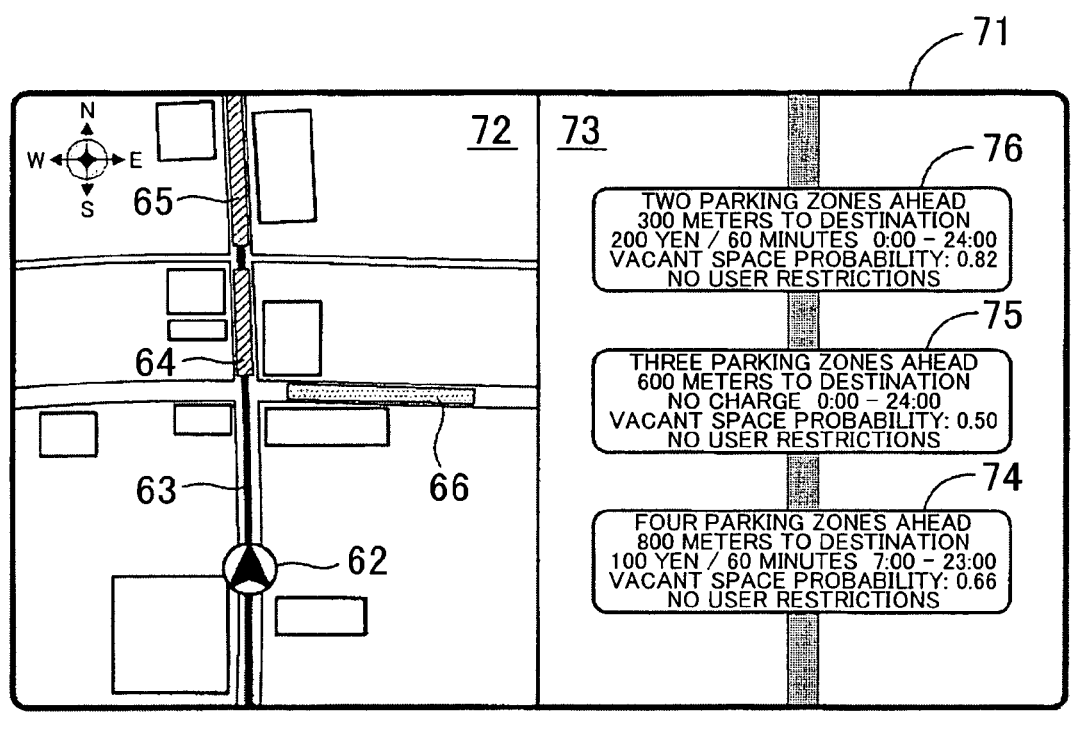
FIG. 15 is an exemplary figure that shows a driving guidance screen that is displayed in a two-screen display mode on the liquid crystal display in the navigation device.

FIG. 15 is a figure that shows a driving guidance screen 71 that is displayed in the two-screen display mode on the liquid crystal display 17 in the navigation device 1 according to the present example. One of the display areas is a left screen 72 that displays the map image of the area surrounding the vehicle, and the other display area is a right screen 73 that displays information that pertains to the next three on-street parking zones that the vehicle will pass. Note that, except for the fact that the information windows 69, 70 are not displayed on the left screen 72, the left screen 72 is identical to the driving guidance screen 61 (FIG. 14) that has already been explained, so an explanation of the left screen 72 will be omitted.

The right screen 73 is provided with three information display spaces 74 to 76. Each of the information display spaces 74 to 76 displays, in the form of text, information that pertains particularly to one of the next three on-street parking zones that the vehicle will pass, among all of the on-street parking zones that are located on the guidance route. Note that the information display space 74, which is positioned at the lowest level, displays information that pertains to the on-street parking zone that is located closest to the current vehicle position along the guidance route. Note also that the information display space 75, which is positioned at the middle level, displays information that pertains to the on-street parking zone that is located in the second closest position to the current vehicle position along the guidance route. The information display space 76, which is positioned at the highest level, displays information that pertains to the on-street parking zone that is located in the third closest position to the current vehicle position along the guidance route. Note that the content that is displayed in the information display spaces 74 to 76 is of the same sort as the content that is displayed in the information windows 69, 70 that are shown in FIG. 14.

Therefore, by referring to the driving guidance screen 71 that is displayed on the liquid crystal display 17, the user can more easily obtain various types of information pertaining to the on-street parking zones that are located on the guidance route.

Next, at S48, the CPU 41 determines whether or not the vehicle has arrived at the destination or has stopped moving. Note that a case in which the vehicle has stopped moving may be equivalent, for example, to a case in which the vehicle has stopped at the same point for at least a specified period of time, to a case in which the ignition switch has been turned off, or the like while vehicle is on a link on which an on-street parking zone is provided. In a case where it is determined that the vehicle has arrived at the destination or has stopped moving (YES at S48), the driving guidance processing program terminates. On the other hand, in a case where it is determined that the vehicle has not arrived at the destination and has not stopped moving (NO at S48), the processing returns to S42, and the driving guidance continues to be provided.

As explained in detail above, according to the present example, when the vehicle is parked in an on-street parking zone in the vicinity of the destination, it is possible for the navigation device 1, the route search method used by the navigation device 1, and the computer programs that are executed by the navigation device 1 to find an optimum route to the destination that traverses a road on which an on-street parking zone is provided. This is possible because, in a case where the destination is set by the user (S1) and the user wants to park in an on-street parking zone, the search is conducted for the on-street parking zones that are located in the vicinity of the set destination (S12), the parking cost factor is computed for each of the on-street parking zones that are found, based on various types of information pertaining to the on-street parking zone that is found (S15), the search cost is modified for each of the links on which an on-street parking zone is provided, based on the computed parking cost factor (S31), and the modified link costs are used in conducting the search for the route to the destination (S32, S34). It is therefore possible to prevent a situation in which the user must drive around to search for and find an on-street parking space, even in a case where the user is a traveler or the like who is not familiar with the streets.

Furthermore, because the link costs are modified based on the various types of information pertaining to the on-street parking zones, it is possible to identify, among a large number of the on-street parking zones, the on-street parking zones that are suitable places for the user to park. It is also possible to find a route that passes the identified on-street parking zones by prioritizing the identified on-street parking zones. It is therefore possible to provide appropriate guidance to the on-street parking zones that the user can use and that are highly convenient, even if there are numerous on-street parking zones for which complicated parking conditions have been established.

Using the information that pertains to the hours that an on-street parking zone is available, the use fee, the distance from the destination to the on-street parking zone, the distance over which parking is possible, the continuousness of the on-street parking zone, the vacant space probability, and the user restrictions makes it possible to identify, among a large number of the on-street parking zones, the on-street parking zones that are suitable places for the user to park and to treat those on-street parking zones as candidates to be passed along the route.

In addition, the shorter the distance is to the destination from an on-street parking zone that is provided on a given link, the lower the link cost is for that link. Therefore, priority can be given to including in the guidance route the on-street parking zones that are close to the destination. This makes it possible for the user to park in an on-street parking zone that is closer to the destination.

Further, the lower the use fee is for an on-street parking zone that is provided on a given link, the lower the link cost is for that link. Therefore, priority can be given to including in the guidance route the on-street parking zones that have low use fees. This makes it possible for the user to park in an on-street parking zone that has a lower use fee.

Moreover, the longer the distance is over which parking is possible in an on-street parking zone that is provided on a given link, the lower the link cost is for that link. Therefore, priority can be given to including in the guidance route the on-street parking zones that have long distances over which parking is possible. This makes it possible to guide the user to an on-street parking zone in which it is more likely that the user will be able to park.

In a case where an on-street parking zone is provided that extends over two or more connected links, the link cost is lower for each of the connected links. Therefore, priority can be given to including in the guidance route the on-street parking zones that are located such that they extend over a plurality of links. This makes it possible to guide the user to an on-street parking zone in which it is more likely that the user will be able to park.

Furthermore, the higher the vacant space probability is for an on-street parking zone that is provided on a given link, the lower the link cost is for that link. Therefore, priority can be given to including in the guidance route the on-street parking zones that have high vacant space probabilities. This makes it possible to guide the user to an on-street parking zone in which it is more likely that the user will be able to park.

Moreover, because the on-street parking zones that satisfy the specified condition for the current route search are specified based on various types of information pertaining to the on-street parking zones (S18 to S21), and because the search is conducted for a route that traverses the roads on which the specified on-street parking zones are provided, it is possible to find a route that traverses the roads on which are provided the on-street parking zones that are suitable places for the user to park.

It should be understood by those skilled in the art that the present invention is not limited by the examples described above and that various improvements and modifications may occur insofar as they are within the scope of the present invention.

For example, in the present example, the route search that is conducted treats all of the on-street parking zones in the vicinity of the destination (for example, within a two-kilometer radius of the destination) as candidates to be passed along the route, regardless of whether the on-street parking zones have use fees or not. However, the route search may also be conducted such that only the on-street parking zones that do not have use fees are treated as candidates to be passed along the route.

The route search may also be conducted such that only a specified number of all of the on-street parking zones in the vicinity of the destination are treated as candidates to be passed along the route and the specified on-street parking zones are passed in order according to their proximity to the destination or according to how low the use fee is.

Furthermore, the present example is configured such that the guidance route that is set definitely passes along a road that is provided with an on-street parking zone in at least one location. However, in a case where there is no on-street parking zone in the vicinity of the destination that satisfies the specified condition for the route search, the guidance route may be set such that it does not pass along a road that is provided with an on-street parking zone.

The present invention may also be configured such that the parking cost factor can be adjusted according to the user's preference. Thus, even in a case where the acceptable ranges for the use fee, the distance to the destination, and the like vary according to the user, the acceptable ranges for each user can be taken into account, making it possible to set a guidance route that passes by a parking site that fits the user's preference.

The present invention may also be configured such that the user can input conditions (for example, an upper limit on the use fee, a straight-line distance to the destination, or the like) for the on-street parking zones for which guidance is desired. The parking cost factor may then be adjusted based on the information that is input.

Further, in the present example, the search cost for a link on which an on-street parking zone is provided is modified by being multiplied by the parking cost factor. However, the present invention may also be configured such that the search cost is modified by adding to or subtracting from the distance covered by a route that passes by an on-street parking zone, in accordance with information that pertains to the on-street parking zone.

For example, the present invention may be configured such that 100 meters is subtracted for each individual parking space that is provided in the on-street parking zones that the route passes or such that 100 meters is subtracted for each 10 meters of parking space in the on-street parking zones. The present invention may also be configured such that 200 meters is subtracted for each on-street parking zone that the route passes and that has a use fee of less than 100 yen per 60 minutes. The present invention may also be configured such that 500 meters is subtracted for each on-street parking zone that the route passes and that has no use fee.

In addition, in the present example, the search cost for a link on which parking conditions have been established for an on-street parking zone is modified by being multiplied by the parking cost factor in accordance with the parking conditions for the on-street parking zone. However, the present invention may also be configured such that the route search is conducted after an across-the-board subtraction is made from the search costs for all of the links on which on-street parking zones are provided regardless of parking conditions.

The present invention may also be configured such that, in the setting of the guidance route, a plurality of route candidates are displayed on the liquid crystal display 17 along with information that pertains to the on-street parking zones that each of the routes passes. The user can then compare the conditions for the on-street parking zones that each of the routes passes. Thus, the present invention may also be configured such that the route that is selected by the user is set as the guidance route.

The present invention may also be configured such that, in a case where the vehicle is farther than a specified distance from the destination, the route search is conducted based on the ordinary search costs that do not take the on-street parking zones into account. When the vehicle reaches the specified distance from the destination, the route search may be conducted again, using the search costs that are modified based on the on-street parking zones. This makes it possible for the route search to take into account the parking conditions during the time when the vehicle will be parking (for example, a use fee that changes according to the time period or the like). It is therefore possible to find the optimum route to the destination that passes by the on-street parking zones.

The navigation device 1 may also include an arrival time prediction unit that predicts the time that the vehicle will arrive at the destination, and the route search may be conducted again, using the search costs that are modified based on the arrival time that is predicted by the arrival time prediction unit and on information that pertains to the on-street parking zones. This makes it possible for the route search to take into account the parking conditions during the time when the vehicle will be parking (for example, a use fee that changes according to the time period or the like), even in a case where the current position is far from the destination and even at a time before the vehicle starts driving toward the destination. It is therefore possible to find the optimum route to the destination that passes by the on-street parking zones.

Further, in the present example, the guidance is provided by displaying the information that pertains to the on-street parking zones in the form of marks and text on the liquid crystal display 17, but the guidance may also be provided by a guidance voice that is output from the speaker 18.

Guidance may also be provided in which the information that pertains to the on-street parking zones includes the time required to move to the destination after parking in the on-street parking zone, the distance from the current position of the vehicle to the on-street parking zone, the time required to arrive at the on-street parking zone from the current position of the vehicle, and the like.

Guidance may also be provided in which the information that pertains to the on-street parking zones includes a degree of recommendation for each of the on-street parking zones. In this case, it is preferable for the degree of recommendation for the on-street parking zone to be determined based on the parking cost factor that is computed at S15. For example, if the parking cost factor is not greater than 0.2, the degree of recommendation for the on-street parking zone is determined to be 1, indicating the highest recommendation. If the parking cost factor is not greater than 0.3, the degree of recommendation for the on-street parking zone is determined to be 2, indicating an intermediate level of recommendation. If the parking cost factor is 0.4 or higher, the degree of recommendation for the on-street parking zone is determined to be 3, indicating the lowest recommendation.

Predicted times of arrival at the on-street parking zones on the guidance route may also be predicted based on the vehicle speed and the link data, and guidance may be provided in which the information that pertains to the on-street parking zones includes the predicted times of arrival.

Furthermore, in a case where it is assumed that the vehicle will be parked in an on-street parking zone and that the user will walk to the destination from the on-street parking zone where the vehicle is parked, the time of arrival at the destination may be predicted based on the vehicle speed and the link data, and guidance may be provided in which the information that pertains to the on-street parking zones includes the predicted times of arrival.

The predicted times of arrival at the on-street parking zones on the guidance route may be predicted based on the vehicle speed and the link data, and guidance may be provided in which the information that pertains to the on-street parking zones includes the use fees for the on-street parking zones at the predicted times of arrival.

The present invention may also be configured such that the navigation ECU 13 executes the processing that is described below.

First, the predicted times of arrival at the on-street parking zones on the guidance route are predicted based on the vehicle speed and the link data.

Next, in a case where it is assumed that the vehicle will be parked in an on-street parking zone and that the user will walk to the destination from the on-street parking zone where the vehicle is parked, the predicted time of arrival at the destination is predicted based on the vehicle speed and the link data.

Next, the times required for round trips between the on-street parking zones and the destination are computed based on the predicted times of arrival.

Next, for each of the on-street parking zones, a determination is made, based on the computed round-trip time, as to whether the on-street parking zone can be used during the time period when the user will make the round trip to the destination. If the on-street parking zone cannot be used, the guidance-eligible parking zone flag is changed from 1 to zero.

Next, the use fee that is required to park in the on-street parking zone where it is assumed that the vehicle will be parked during the round-trip time period is computed based on the computed round-trip time. Guidance is then provided in which the information that pertains to the on-street parking zone includes the computed use fee. This improves the convenience for the user who parks in an on-street parking zone.

In the present example, the parking sites for which the guidance is provided are on-street parking zones that are provided on the street, but the parking sites for which the guidance is provided may also include parking sites that are provided off of the street. For example, the present invention may be configured such that, in a case where the user indicates an intention to park even in an off-street parking site, a route is set that traverses a road with an on-street parking zone and also passes by an off-street parking site in the vicinity of the destination, and guidance is provided for that route. Information that pertains to the off-street parking site may also be displayed on the driving guidance screens 61, 71 (FIGS. 14 and 15).

What is claimed is:

1. A navigation device for installation in a vehicle, comprising:
   a memory; and
   a controller specifically configured to:
   set a destination;
   find an on-street parking zone that is in a different location from the destination and that is in the vicinity of the destination, the on-street parking zone being an area where parking is available on a strip along the street;
   find a route that will arrive at the destination by way of a road having the on-street parking zone;
   acquire parking information that pertains to the on-street parking zone, the parking information including information that pertains to a length of the strip of the on-street parking zone;
   identify a link corresponding to the street having the on-street parking zone;
   modify a search cost of a route including the identified link by lowering a link cost of the identified link by an amount corresponding to the length of the strip of the on-street parking zone, the amount by which the link cost is reduced being larger the longer the length of the strip of the on-street parking zone; and
   search for a route to the destination based on the modified search cost.

2. The navigation device according to claim 1, wherein the controller is specifically configured to:
   search for the route when the vehicle has reached a specified distance from the destination.

3. The navigation device according to claim 1, wherein the controller is specifically configured to:
   predict a time of arrival at the destination; and
   modify the search cost based on the parking information and on the time of arrival.

4. The navigation device according to claim 1, wherein the parking information further includes information that pertains to at least one of a time period when the on-street parking zone can be used, a use fee, a distance from the on-street parking zone to the destination, a continuousness of the on-street parking zone, a vacant space probability, and a user restriction.

5. The navigation device according to claim 4, wherein the controller lowers a link cost for a link on which an on-street parking zone is provided to the extent that the distance from the on-street parking zone to the destination is short.

6. The navigation device according to claim 4, wherein the controller lowers a link cost for a link on which an on-street parking zone is provided to the extent that the use fee for the on-street parking zone is low.

7. The navigation device according to claim 4, wherein the controller lowers a link cost for a link on which an on-street parking zone is provided to the extent that the vacant space probability for the on-street parking zone is high.

8. The navigation device according to claim 1, wherein the controller, in a case where an on-street parking zone is provided that extends over two or more connected links, lowers a link cost for each of the connected links.

9. The navigation device according to claim 1, wherein the controller is specifically configured to:
   specify an on-street parking zone that satisfies a specified condition; and
   find another route by way of another road having the on-street parking zone that satisfies the specified condition.

10. The navigation device according to claim 1, wherein the controller provides guidance, based on the parking information, to the on-street parking zone that is located on the route.

11. A navigation method that is implemented by a navigation device, the method comprising:
   setting a destination;
   finding an on-street parking zone that is in a different location from the destination and that is in the vicinity of the destination, the on-street parking zone being an area where parking is available on a strip along the street;
   finding a route that will arrive at the destination by way of a road having the on-street parking zone;
   acquiring parking information that pertains to the on-street parking zone, the parking information including information that pertains to a length of the strip of the on-street parking zone; and
   modifying a search cost of a route including the identified link by lowering a link cost of the identified link by an amount corresponding to the length of the strip of the on-street parking zone, the amount by which the link cost is reduced being larger the longer the length of the strip of the on-street parking zone; and
   searching for a route to the destination based on the modified search cost.

12. The navigation method according to claim 11, further comprising:
   search for the route when the vehicle has reached a specified distance from the destination.

13. The navigation method according to claim 11, further comprising:

predicting a time of arrival at the destination; and modifying the search cost based on the parking information and on the time of arrival.

14. The navigation method according to claim 11, further comprising providing guidance, based on the parking information, to the on-street parking zone that is located on the route.

15. A non-transitory computer-readable storage medium storing a computer-executable program usable to find on-street parking, the program comprising:

instructions for setting a destination;

instructions for finding on-street parking zone that is in a different location from the destination and that is in the vicinity of the destination, the on-street parking zone being an area where parking is available on a strip along the street; and instructions for finding a route that will arrive at the destination by way of a road having the on-street parking zone;

instructions for acquiring parking information that pertains to the on-street parking zone, the parking information including information that pertains to a length of the strip of the on-street parking zone; and instructions for modifying a search cost of a route including the identified link by lowering a link cost of the identified link by an amount corresponding to the length of the strip of the on-street parking zone, the amount by which the link cost is reduced being larger the longer the length of the strip of the on-street parking zone; and instructions for searching for a route to the destination based on the modified search cost.

16. The computer-readable medium according to claim 15, the program further comprising:

instructions for providing guidance, based on the parking information, to the on-street parking zone that is located on the route.

17. A navigation device for installation in a vehicle, comprising:

a memory storing links representing roads and on-street parking zones, each on-street parking zone being associated with a link; and a controller specifically configured to:

set a destination;

receive an input indicating a desired characteristic of an on-street parking zone, the on-street parking zone being an area where parking is available on a strip along the street, the desired characteristic being a minimum length of the strip of the on-street parking zone;

identify at least one stored on-street parking zone having the desired characteristic that is in a different location from the destination and that is within a specified distance of the destination;

identify a link corresponding to the street having the on-street parking zone;

modify a search cost of a route including the identified link by lowering a link cost of the identified link by an amount corresponding to the length of the strip of the on-street parking zone, the amount by which the link cost is reduced being larger the longer the length of the strip of the on-street parking zone;

search for a route to the set destination based on the modified search costs;

determine whether the route found by the search includes at least one link associated with an identified on-street parking zone;

when the route found by the search includes at least one link associated with an identified on-street parking zone, provide guidance based on the route found by the search; and when the when the route found by the search does not include at least one link associated with an identified on-street parking zone, modify the route to include a link associated with an identified on-street parking zone that is closest to the set destination and provide guidance based on the modified route.

* * * * *